United States Patent
Sadr (10) Patent No.: US 7,729,244 B2
(45) Date of Patent: Jun. 1, 2010

(54) DYNAMIC RESOURCE ALLOCATION BASED ON QUALITY-OF-SERVICE

(75) Inventor: Ramin Sadr, Los Angeles, CA (US)

(73) Assignee: The Boeing Company, Chicago, IL (US)

(*) Notice: Subject to any disclaimer, the term of this patent is extended or adjusted under 35 U.S.C. 154(b) by 828 days.

(21) Appl. No.: 11/268,831

(22) Filed: Nov. 8, 2005

(65) Prior Publication Data

US 2007/0104101 A1 May 10, 2007

(51) Int. Cl.
*G01R 31/08* (2006.01)
*H04B 7/185* (2006.01)
*H04J 3/16* (2006.01)
*H04W 72/00* (2009.01)

(52) U.S. Cl. ............ 370/230; 370/316; 370/468; 370/252; 455/12.1; 455/452.2

(58) Field of Classification Search ........ 370/230, 370/252, 468, 316, 329, 349, 450, 452.1, 370/452.2, 395.43; 455/450, 452.1, 452.2, 455/13.1, 12.1
See application file for complete search history.

(56) References Cited

U.S. PATENT DOCUMENTS

| | | | |
|---|---|---|---|
| 4,256,925 A * | 3/1981 | Goode | 370/322 |
| 6,070,052 A * | 5/2000 | Ogasawara et al. | 455/13.1 |
| 6,366,761 B1 * | 4/2002 | Montpetit | 455/12.1 |
| 6,937,580 B2 * | 8/2005 | Heatwole et al. | 370/322 |
| 6,985,455 B1 * | 1/2006 | Heath et al. | 370/316 |
| 7,085,247 B2 * | 8/2006 | Schweinhart et al. | 370/316 |
| 7,142,522 B2 * | 11/2006 | Baudoin et al. | 370/322 |
| 7,219,132 B2 * | 5/2007 | Hreha et al. | 709/217 |
| 7,366,134 B2 * | 4/2008 | Bose et al. | 370/329 |
| 2003/0236854 A1 * | 12/2003 | Rom et al. | 709/217 |
| 2004/0072562 A1 * | 4/2004 | Heuvel et al. | 455/428 |
| 2006/0215628 A1 * | 9/2006 | Olariu et al. | 370/348 |

\* cited by examiner

*Primary Examiner*—Steven H Nguyen
*Assistant Examiner*—Candal Elpenord
(74) *Attorney, Agent, or Firm*—Yee & Associates, P.C.; Baldwin D. Quan (57) ABSTRACT

A method and system for allocating a satellite payload terminal's (payload terminal) resources in response to a plurality of flow requests received by the payload terminal from one or more ground terminals is provided. The method includes, prioritizing the plurality of flow requests received at the payload terminal for a given epoch time based upon one or more attributes of said flow requests; and allocating resources of payload terminal to each said flow requests during said epoch time based on priority of flow requests. The attributes of said flow requests includes one or more of Quality of Service (QOS), rate request, and file size. The system includes one or more payload terminals having a processing unit capable of executing an optimization processes to allocate resources payload terminal resources in response to a plurality of flow request from one or more ground terminals.

17 Claims, 10 Drawing Sheets

Parameter Space

- Up link rate      $R_i \in |\Lambda| \leq 15$
- File Size      $S_i \in \Re$
- Modulation Mode      $M_i \in |E|^2 \leq 15$
- QOS      $Q_i \in |O| \leq 16$
- Time Slot      $T_i \in |T| \leq 288$
- Bandwidth      $B_i \in |B| \leq 4$
- Channel      $c_i \in |\Xi| \leq 48$

FIG. 1C $$\underset{Q_i \in O}{\text{Max}} \sum Q_i^n$$

Subject to:    $\sum R_i^n \leq \beta$ $\sum T_i^n \leq N_n^4$ $\sum M_i^n \leq \alpha$    $\sum S_i^n = c$   Total offered load where:   $\alpha = f(T_i^n, B_i^n, M_i^n)$
$\beta = g(T_i^n, B_i^n, M_i^n)$

DYNAMIC RESOURCE ALLOCATION BASED ON QUALITY-OF-SERVICE

CROSS REFERENCE TO RELATED APPLICATION

None

BACKGROUND OF THE INVENTION

1. Field of Invention

This invention relates generally to communication systems, and in particular, to a method of optimizing resource allocation in a communication system network.

2. Background

Satellite based networks are commonly used today. In atypical satellite network, plural satellites (also referred to as a payload terminal) communicate with various types of ground terminals. The satellite terminals (or ground terminals) are distributed in various geographical locations, which are covered by one of the various beams that the satellite network provides. Satellite payloads have on-board digital switching which enables re-directing of traffic from terminals to different beams and cross links geographically dispersed satellite constellations.

A payload terminal's resources are shared by plural ground terminals, connected to end-users. The ground terminals send flow requests corresponding to various applications, for example, voice, video, data, graphics and others. Typical ground terminals that compete for satellite resources include the Internet and other public, private, and/or government computer-based networks; wireless telecommunications such as cellular, Personal Communication Service (PCS), land-mobile, and the like; terrestrial and satellite direct broadcasts including traditional AM/FM bands, broadband, television, video, geo-location and navigation via a global position system (GPS), and the like.

Typically, ground terminals in the same beam control cannot be assigned the same time slot and frequency. If the ground terminals are assigned the same slot or frequency band, destructive interference arises, resulting in performance degradation. This problem is further enhanced when the demands presented by the ground terminals are based on quality of service (QOS) levels or priorities. The flow requests that originate from the ground terminal exhibit high variability and unpredictability. Each connection requires certain payload terminal's bandwidth, to guarantee the QOS expected by the ground terminals.

Requests for a payload terminal's resources from various ground terminals are subject to congestion caused by unpredictable statistical fluctuations of flow requests and traffic conditions when the offered load exceeds the payload capacity. Management of flow requests is important for successful operation of the satellite network. In the absence of effective flow request traffic management, flow request traffic from terminals can exceed the capacity of the network, resulting in dropped packets and frames which in turn translate into an overall degradation of communication network performance and loss of the end user's data.

Accordingly, there is a need for a method and system for optimizing the payload terminals and ground terminals resource allocations for flow request traffic in a satellite communication network in order to efficiently provide optimal service to the ground terminals.

SUMMARY OF THE INVENTION

In one aspect of the present invention, a method for allocating a satellite payload terminal's (payload terminal) resources in response to a plurality of flow requests received by the payload terminal from one or more ground terminals is provided. The method includes, prioritizing the plurality of flow requests received at the payload terminal for a given epoch time based upon one or more attributes of said flow requests; and allocating resources of payload terminal to each said flow requests during said epoch time based on priority of flow requests. The attributes of said flow requests includes one or more of Quality of Service (QOS), rate request, and file size.

In another aspect of the present invention, a satellite resource allocation system is provided. The system includes one or more payload terminals having a processing unit capable of executing an optimization process to allocate payload terminal resources in response to a plurality of flow request from one or more ground terminals; wherein the processing unit prioritizes the plurality of flow requests received at the payload terminal for a given epoch time based upon one or more attributes of said flow requests. The payload terminal then allocates resources of the payload terminal to each said flow requests during said epoch time based on priority of flow requests.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following.

FIG. IE shows a top-level block diagram of the Optimizer, according to one aspect of the present invention.

DETAILED DESCRIPTION OF THE PREFERRED EMBODIMENTS

In one aspect of the present invention, an optimization technique (process/algorithm) is provided that is used to allocate a satellite's resources namely, bandwidth and time slots for Space, Frequency and time Division Multiplexing (S/F/TDMA) in real time based on the QOS of a request from a ground terminal.

To facilitate an understanding of the preferred embodiment, the general architecture and operation of a communication system will be described first. The specific process under the preferred embodiment will then be described with reference to the general architecture.

Figure 1A:
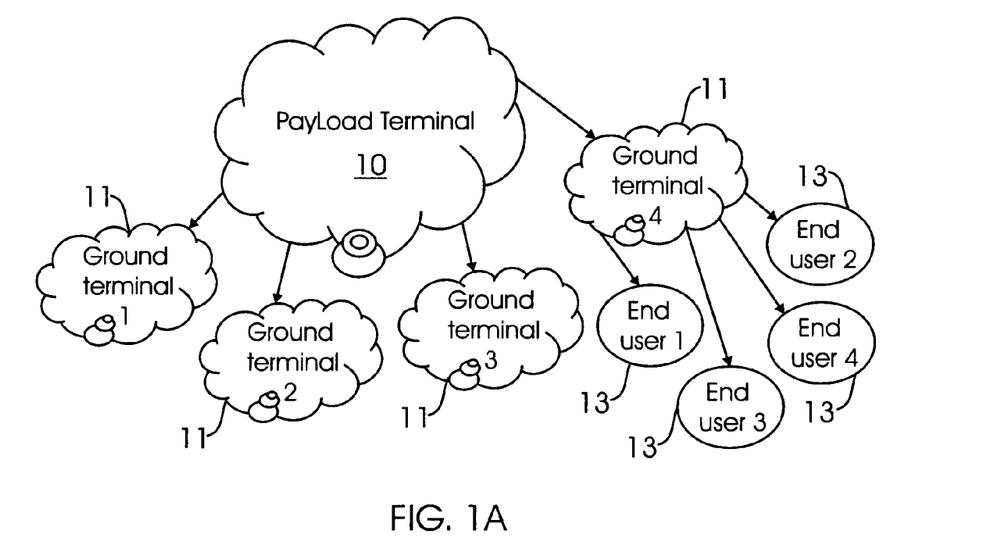
FIG. 1A shows a block diagram of a communication system illustrating a payload terminal and ground terminals serviced by the payload terminal.

Communication System:

FIG. 1A shows a top-level block diagram of a communication system. The communication system includes a plurality of payload terminals 10 distributed in a geostationary orbit and a large population of ground terminals 11 covered under one or more payload terminals 10. The present invention is not limited to any particular number of ground or payload terminals.

A typical ground terminal 11 supports multiple end users 13. Data from the ground terminals 11 can be any one or a combination of voice, video, graphics and data traffic. The ground terminals 11 are distributed geographically in various locations and each of the ground terminals 11 is ideally covered in at least one of the beams provided by payload terminal 10. Typically, different ground terminals 11 covered under the same beam of a payload terminal 10 are assigned different time slots and frequency (bandwidth) to avoid destructive interference of traffic signals.

The link between the ground terminals 11 and end users 13 and the link between the ground terminals 11 and payload terminals 10 are through a communication interface (standard or proprietary). Communication interface, as referenced in this invention, provides a two-way data communication link between the ground terminals 11, between the ground terminals 11 and payload terminals 10 and between the ground terminals 11 and end users 13. The communication link may use carrier waves, as is well known in the art, to transmit digital data streams.

Figure 1B:
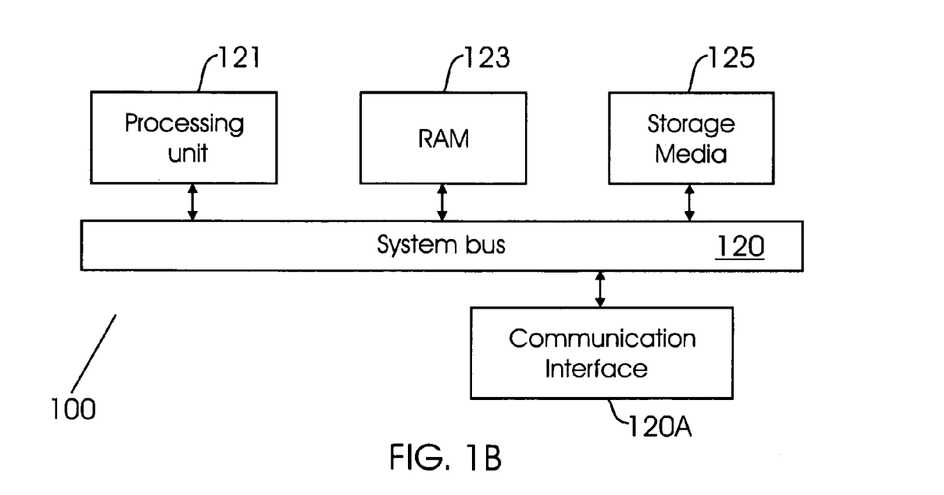
FIG. 1B shows the internal architecture of a computing system used by a payload terminal, according to one aspect of the present invention.

FIG. 1B is a system diagram showing the architecture of a computing system 100 that may be used to execute the process steps, according to one aspect of the present invention. Payload terminal 10 includes a computing system for executing the optimization process steps of the present invention. A processing unit 121 in the payload terminal 10 executes the optimization step. Processing unit 121 is connected to a storage device 125 through a system bus 120.

Storage device 125 includes disks, tapes, integrated circuits, or the like, operative to hold data by any means, including magnetically, electrically, optically, and the like. Storage device 125 may store operating system program files, application program files, computer-executable process steps, and other files. Some of these files are stored on storage device 125 using an installation program.

Random access memory ("RAM") 123 also interfaces with processing unit 121. When executing stored executable process steps from storage device 125, processing unit 121 stores and executes the process steps out of RAM 123. Communication interface 120A allows connectivity between payload terminal 10 and a ground terminal 11.

It is noteworthy that the present invention is not limited to the FIG. 1B architecture. For example, any other system capable of running computer-executable process steps, as described below, may be used to implement the various aspects of the present invention.

Figure 1C:
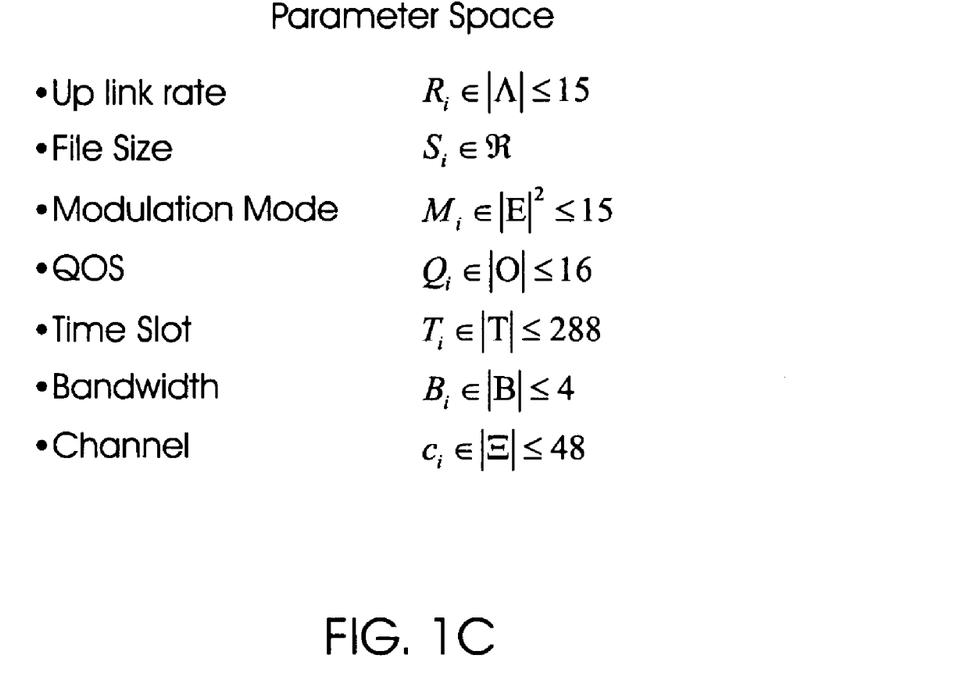
FIG. 1C illustrates the parametric limitations of various attributes that are used by an Optimizer according to one aspect of the present invention.

Parametric Space:

FIG. 1C shows an example of a set of spaces that are used for formulating a mathematical model for dynamically allocating bandwidth in response to flow requests from plural ground terminals. The various parameters are as follows:

$R_i$ (Uplink rate in bps), the rate at which data is uploaded to the payload terminal 10;

$S_i$ (File size/size of offered load in bytes), the size of the data blocks;

$M_i$ (Modulation Mode in bps/Hz) supported for a given frame;

QOS, quality of service (priority);

$T_i$ (Integer index to time slot), is the time slot allocated to a ground terminal request;

$B_i$ (Integer index to number of frequency bands) is the bandwidth allocated to a ground terminal request; and $C_i$ (Integer index to number of frequency channel) is the frequency channel used for the communication between the payload and ground terminal.

Figure 1D:
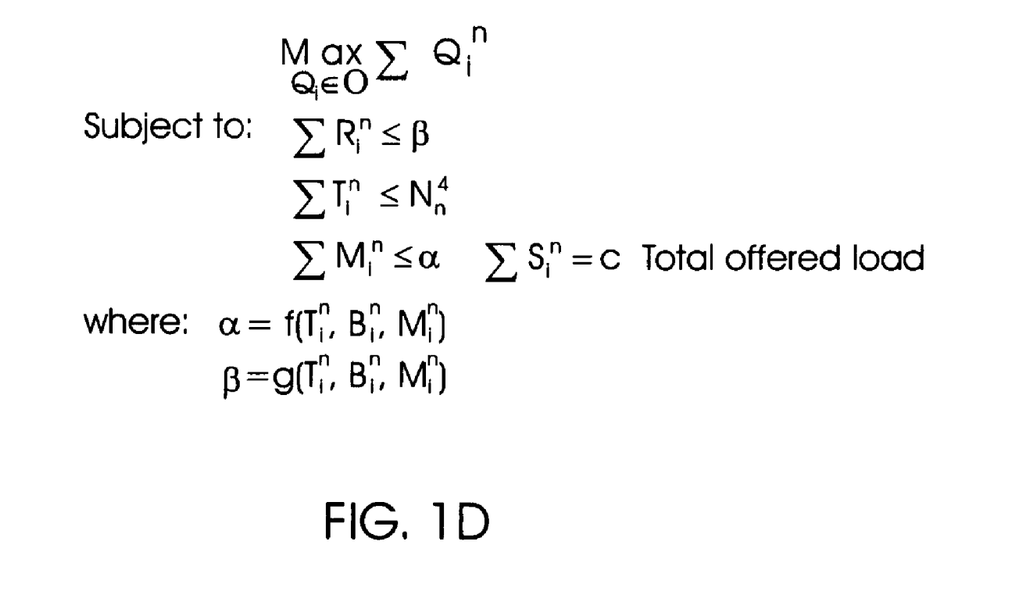
FIG. 1D illustrates an objective function solved, according to one aspect of the present invention.

Objective Function:

FIG. 1D summarizes the optimization problem as an objective function associated with a set of constraints (defined in FIG. 1C). The constraints are summarized as follows:

Total rate of link (Ri) is bounded by the maximum data rate that the terminal supports.

There is finite number of time slots (Ti).

There is a finite number of modulation modes (Mi) that can be supported at any given frame or packet during an epoch time.

The total requested flow size (Si) is finite and bounded.

The objective function (Qi) is to solve for maximizing the quality of services provided by the satellite network to the customers (i.e. terminals).

The various parameters are inter-related via some known functions shown as $\alpha = f(Ti'', Bi'' Mi'')$ and $\beta = g(Ti'', Bi'', Mi'')$, these functions are discrete design equations (or look-up tables) for a particular satellite network architecture.

It is noteworthy that other constraints may be used in the adaptive aspects of the present invention.

Figure 1E:
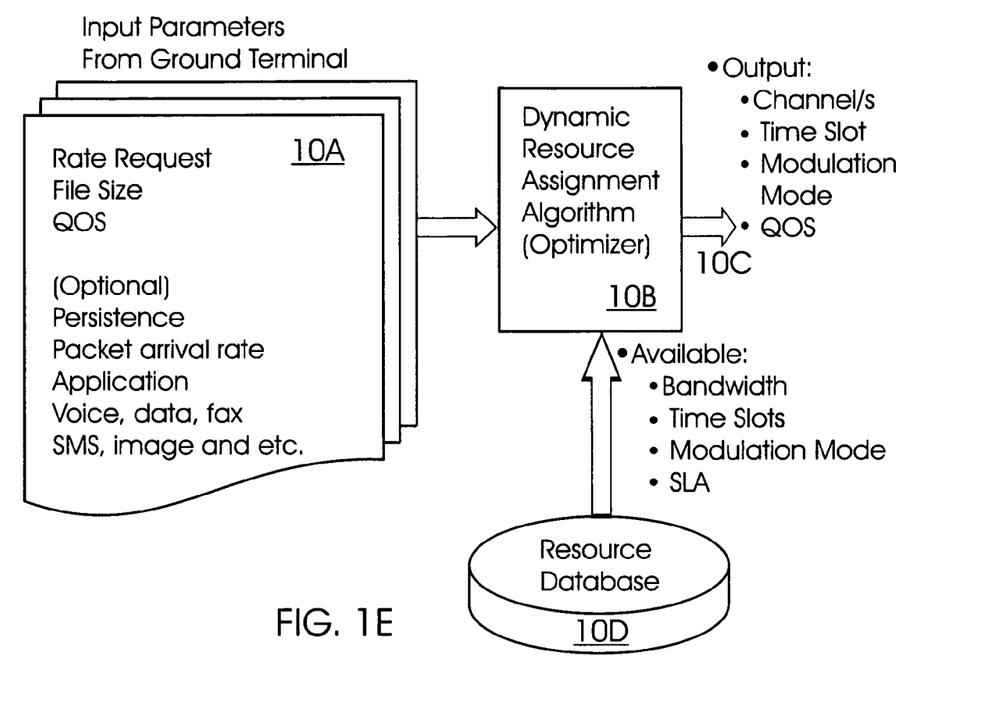

Optimizer:

FIG. 1E shows a top-level block diagram of an optimizer 10B that dynamically allocates payload terminals 10 resources based on QOS. Optimizer 10B solves the problem of assignment of channel, time slot, modulation mode and QOS assigned to the flow request from the terminal.

A series of flow requests (10A) are presented to the payload terminal 10 for capacity assignment. That is in bits per second, ranging from the lowest to highest data rates that each ground terminal supports.

The flow requests 10A are requests for services at the appropriate payload terminal 10 over the given epoch time. The flow requests could be a combination of any one or more of voice, data, graphics, image, etc. Each of the flow requests generated by a ground terminal 11 can be treated as a node. Each of the flow requests has one or more flow request attributes associated with it, such as flow request identification, rate request, file size, quality of service (QOS) level, original or originating ground terminal identification, time slot in which it was received, to name a few. Each of the flow request's attributes is finite and bounded to the extent that a payload terminal 10 and ground terminal 11 supports.

The flow request includes the rate, the flow size (or file size in bytes) and QOS level. There can be multiple QOS levels from each terminal for each flow request, since typically there are multiple flow requests from the same terminal. There could be more than one flow requests originating from each ground terminal 11 and each flow requests, in turn, could have multiple QOS levels associated with it.

An epoch time refers to a complete cycle time in the present invention. For example: The flow requests received at a payload terminal 10 are refreshed every epoch time of, say, 20 milliseconds. The epoch time would be the time that the Optimizer 10B would use to complete allocation of resources of payload terminal including prioritizing the received flow requests, allocating resources of payload terminal 10 and re-allocating resources of payload terminal 10 based on the availability of resources of payload terminal 10 and the capacity of the resources at one or more ground terminal 11.

It is assumed that the payload terminal 10 has prior knowledge of each ground terminal's capabilities that is maximum bandwidth it supports, the number of time slots per each frame, the modulation modes permitted at any given time to a particular beam or network of terminals.

The Optimizer 10B allocates appropriate resources of payload terminal 10 to each of the flow request (10A) received at the payload terminal 10 during the given epoch time, based on resource limitations of the ground terminal 11 and availability of resources of the payload terminal 10. A resource allocation matrix, a resource database, a resource table (may jointly be referred to as resource database) 10D is provided to payload terminal 10 to store and update the resource attributes and limitations of each ground terminal 11 covered under the network of the payload terminal 10, and also to store and update the resource attributes of the payload terminal 10 during each epoch time.

Optimizer 10B can refer to resource database 10D to obtain the resource limitations of each of the ground terminal within the payload terminal's 10 network and available resources of the payload terminal 10 during allocation of the resources of the payload terminal 10. The resources of payload terminal 10 are finite and bounded and can include payload terminal identification, bandwidth supported, modulation modes supported, number of time slots available, number of channels available in the supported bandwidth, types of channels supported, to name a few.

The resources of ground terminal 11 are also finite and bounded and can include ground terminal identification, maximum bandwidth supported at the ground terminal 11, number of quanta allocated for each frame of data, the modulation modes permitted at any given time, types of channels permitted within the supported bandwidth. The term quanta as used in the Figures and throughout this specification refers the product of smallest frequency band times a single time slot. Time slot as used in this application is the smallest interval of time used for carrying out an activity or event.

Continuing to refer to 1E, the Optimizer 10B provides each of the flow requests (10B) at the given epoch time appropriate payload terminal 10 resources (shown as Output 10C) to service the flow request. Some of the resources of payload terminal 10 provided to service the flow requests are bandwidth, Channel/s, time slot, and modulation mode (10C).

Figure 2:
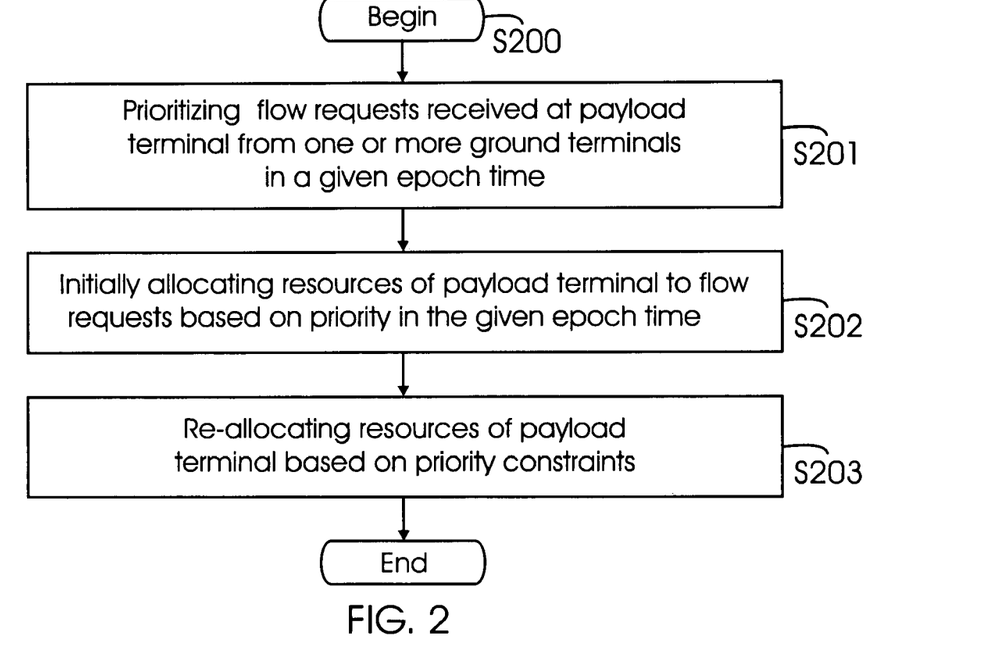
FIG. 2 shows a flow diagram for dynamically allocating resources, according to one aspect of the present invention.

Process Flow:

The optimization process is now explained in greater detail. FIG. 2 shows a top-level process flow diagram of executable process steps used by optimizer 10B, according to one aspect of the present invention. The process starts in step S200 and in step S201, the plurality of flow requests received at a payload terminal 10 are prioritized. Thereafter, the resources are allocated in step S202 and re-allocated (if needed) in step S203.

Figure 3:
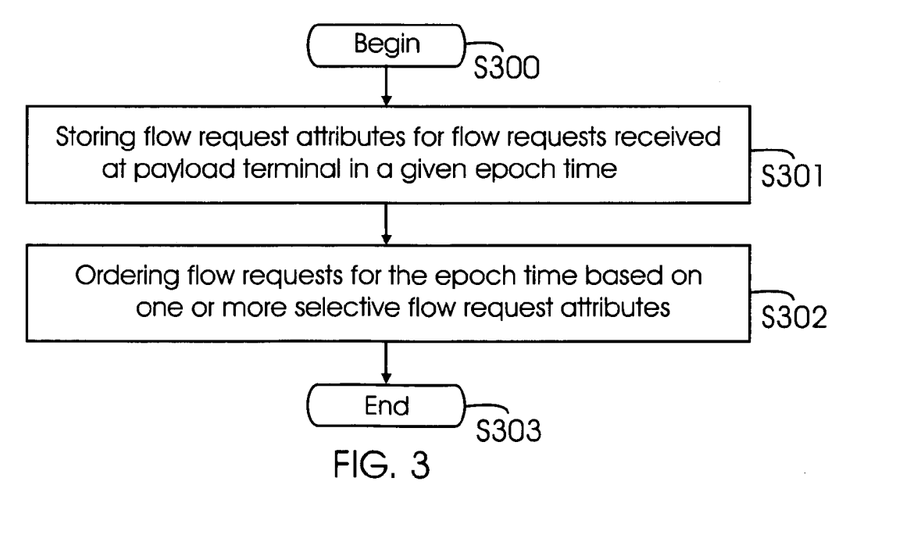
FIG. 3 shows a flow diagram for prioritizing flow requests referenced in FIG. 2.

Step S201 is described below in greater detail with respect to FIG. 3, while step S202 and S203 are described with respect to FIG. 4 and 5 respectively.

Prioritizing Flow Requests:

Gathering all the flow requests and ordering them in a specific sequence can prioritize the flow requests. Step S201 is now described in detail with reference to FIG. 3.

The process starts in step S300 and in step S301, a plurality of flow requests originating from each ground terminals 11 during a given epoch time are received at the payload terminal 10 and stored in a resource demand matrix (or simply the demand matrix) on the payload terminal 10. The demand matrix could be stored on a volatile or non-volatile storage media 125. It is to be noted that the communication link between the payload terminal 10 and the plurality of ground terminals 11 has sufficient signal-to-noise ratio or received power at the payload to reliably communicate and close the link for the requested flow. This link adaptation is assumed to be a separate layer of the ground terminal and network control software (not shown) as to assure the appropriate closure of the link.

In step S302, the flow requests (10A) received at the payload terminal 10 from one or more ground terminals 11 are ordered in the demand matrix based on one or more flow request attributes. The demand matrix is a two dimensional matrix with each ground terminal 11 along the row of the demand matrix and the flow request attributes along the column for each ground terminal 11 ordered based on one or more of the flow request attributes for each flow request from each ground terminal 11.

In one embodiment of the invention, the flow requests are first ordered based on descending order of QOS of the flow request of each ground terminal 11, descending order of rate request within each QOS level of each ground terminal 11 and descending order of aggregate rate request within each rate request of each QOS level, from a particular ground terminal 11. A plurality of auxiliary parameters can also be used to order the flow requests in the demand matrix. In this case, the auxiliary parameters would be included along the columns of the demand matrix. A sample set of auxiliary parameters can include bandwidth capability set, modulation mode capability set, aggregate rate request from all the flow requests for each ground terminal 11.

Figure 8:
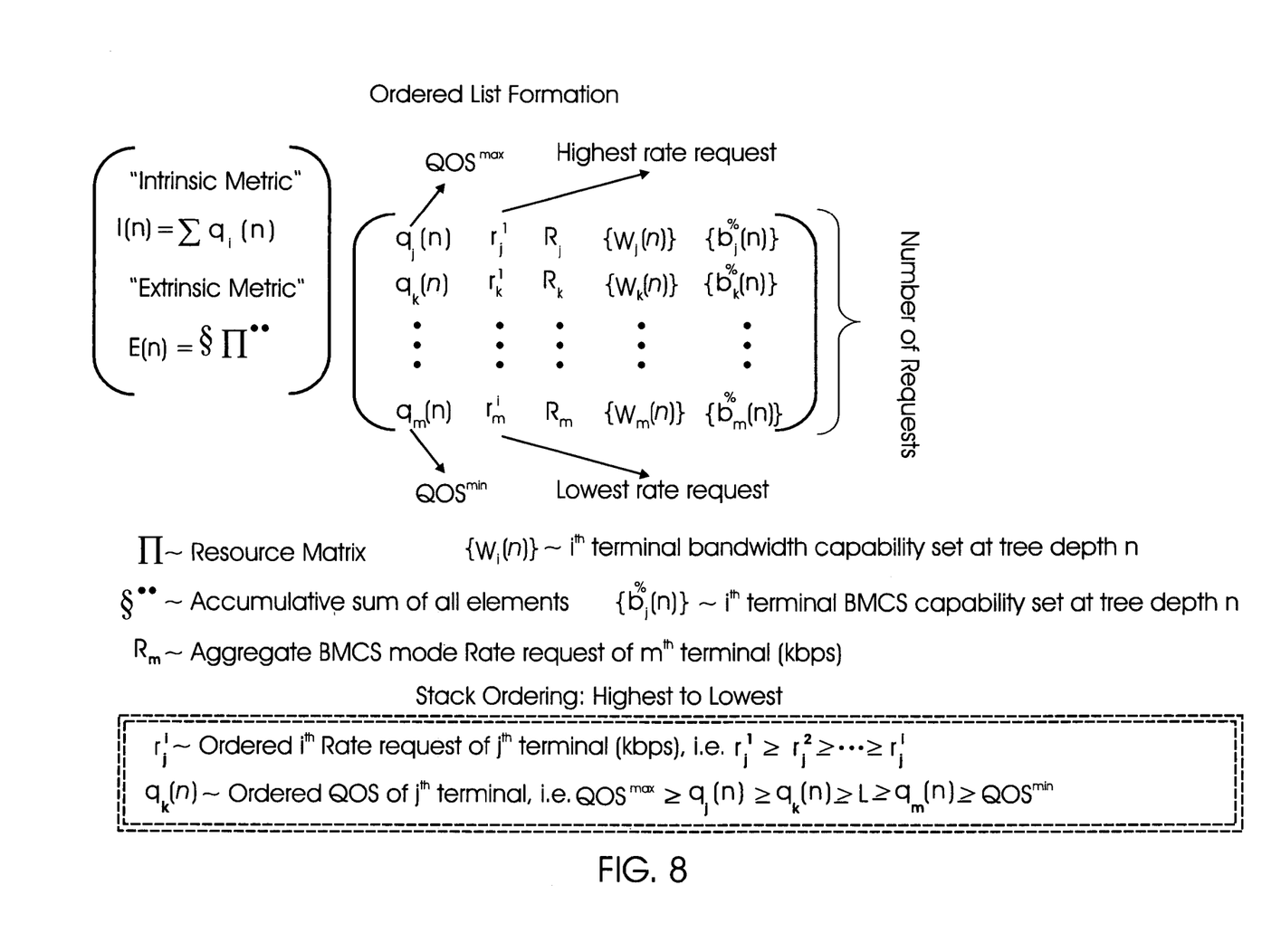
FIG. 8 illustrates a sample Ordered List formation, according to one aspect of the present invention.

A sample demand matrix of flow requests is illustrated in FIG. 8 of the drawings. For example: The $q_j$ (n) in FIG. 8 refers to ordered flow request QOS of jth ground terminal at level n of the tree. In case of parent node, n would be 1. The $r^i_j$ in FIG. 8 refers to the $i^{th}$ rate request of $j^{th}$ terminal (in kbps). Similarly, $R_m$ in FIG. 8 represents the aggregate BMCS (Bandwidth Modulation Capability Set) mode rate request of $m^{th}$ terminal (in kbps). The intrinsic metric in FIG. 8 is defined as the sum of QOSs' over the demand matrix for the specific ground terminal 11 at a specific level of the tree.

Figure 10:
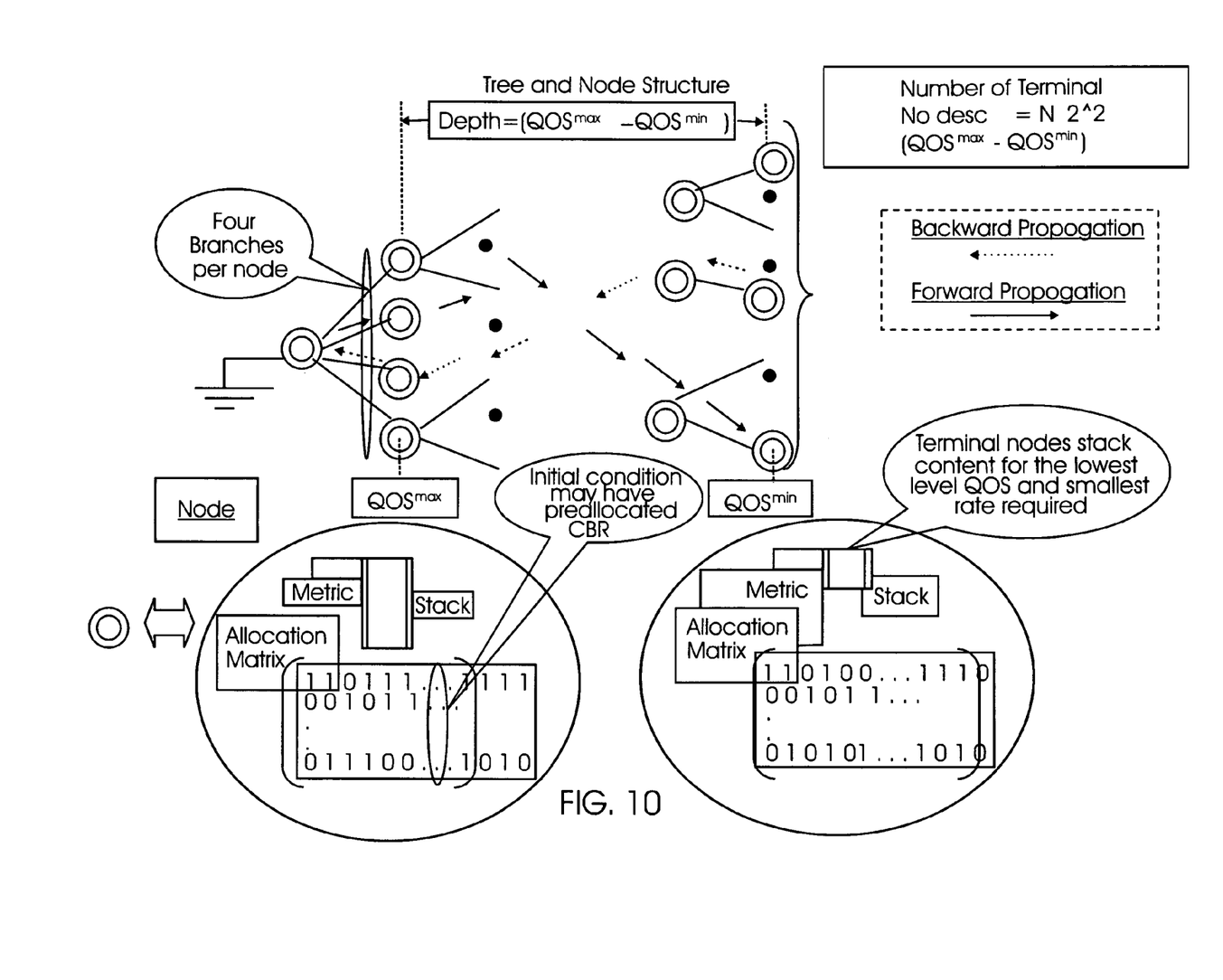
FIG. 10 illustrates a Tree and Node structure used by the Optimizer, according to one aspect of the present invention.

The stack of ordered flow requests in the demand matrix is extended in a tree format to include all flow requests received at the payload terminal during a given epoch time. The parent node in the tree structure is the ordered flow request at the top of the demand matrix for each ground terminal 11 as shown in FIG. 10. Each node of the tree, based on forward recursion algorithm, extends multiple branches, where each branch would represent the supported modulation and bandwidth mode by the ground terminal 11 with descending QOS levels for flow requests from each ground terminal 11. A sample tree and node structure for the aforementioned stack of ordered flow requests is illustrated in FIG. 10.

Figure 4:
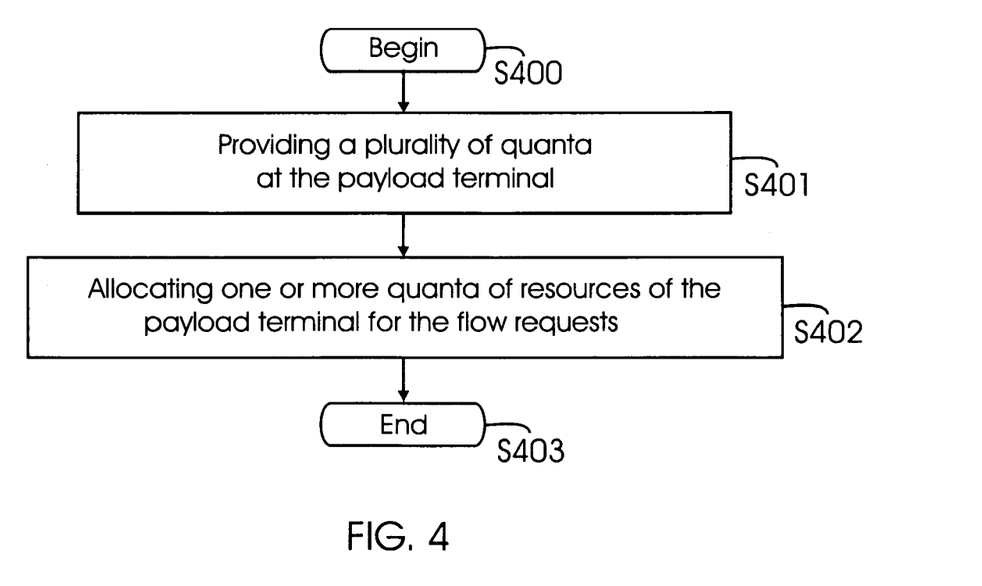
FIG. 4 shows a flow diagram for allocating resources of a payload terminal as referenced in FIG. 2.

Allocating/Re-allocating resources:

The step of allocating resources of the payload terminal 10 to each of the flow requests based on the priority (as shown in step S202 of FIG. 2) is now explained in greater detail with respect to FIG. 4.

Turning in detail to FIG. 4, the process starts in step S400. Allocating resources of the payload terminal 10 includes providing a plurality of quanta at the payload terminal and allocating one or more quanta of resources of the payload terminal 10 to a flow request.

Figure 7:
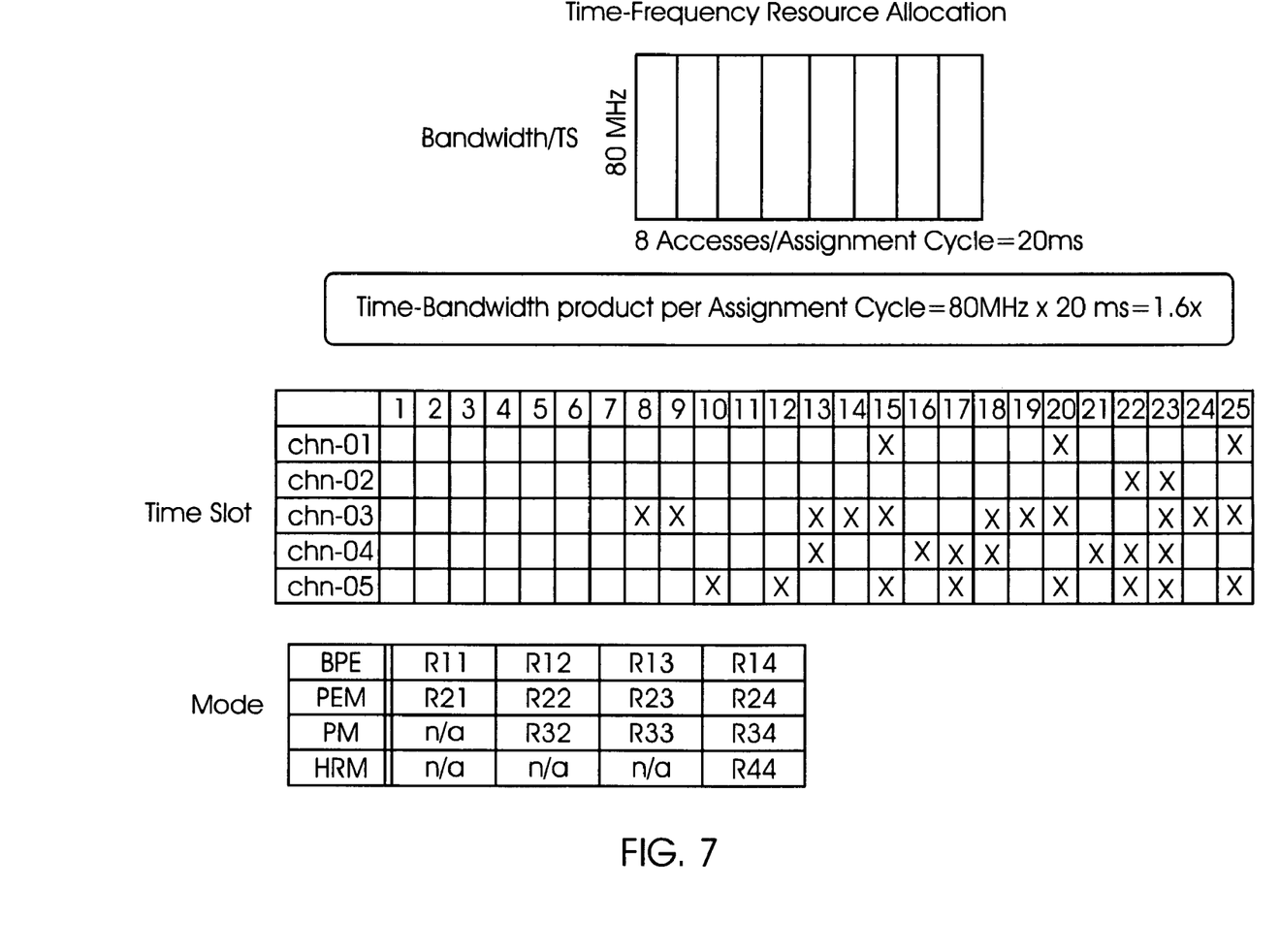
FIG. 7 illustrates sample Time-bandwidth resource allocations according to one aspect of the present invention.

A two dimensional matrix is modeled with the time and bandwidth (broken down 10 into units of smallest bandwidths) represented as columns and rows respectively as shown in FIG. 7 and is made available to the Optimizer 10B. The "x" marks in some of the quanta represent the allocations of these quanta for the flow requests for the given epoch time.

This two dimensional matrix represents the time-bandwidth resource allocation matrix (or simply resource allocation matrix). A plurality of modulation modes permitted within the bandwidth is/represented in FIG. 7 as different shades of grey squares. Each of the squares in this two dimensional matrix represents a quanta. By providing a plurality of quanta at the payload terminal 10 for each flow request based on its priority (S401 of FIG. 4), the resources of the payload terminal 10 are optimally used with very little to no wastage of resources of the payload terminal 10.

Allocating one or more quanta of resources of the payload terminal 10 to a flow request, assigns time slot, bandwidth and modulation modes of the payload terminal 10 at the given epoch time (S402 FIG. 4). Allocation of quantas is based on the priority of the flow requests and the parametric limitations of each of the resource attributes at each of the ground terminals 11, available resources of the payload terminal 10 and the communication link capacity. The goal of the Optimizer 10B is to maximize the usage of resources of the payload terminal 10 without sacrificing the QOS for the flow requests.

Optimizer 10B starts with the flow requests at the first highest priority level in the demand matrix and proceeds to allocate the resources of the payload terminal 10 to each of the flow requests at that priority level for a given epoch time. After completing the allocation of resources of the payload terminal 10 for that priority level, the Optimizer 10B then proceeds to the second highest priority level and allocates resources of payload terminal 10 to each of the flow requests at the second highest priority level for the given epoch time. Optimizer 10B proceeds in this manner, to allocate resources of the payload terminal to all the flow requests (10A) at all the QOS levels for the given epoch time.

Figure 9:
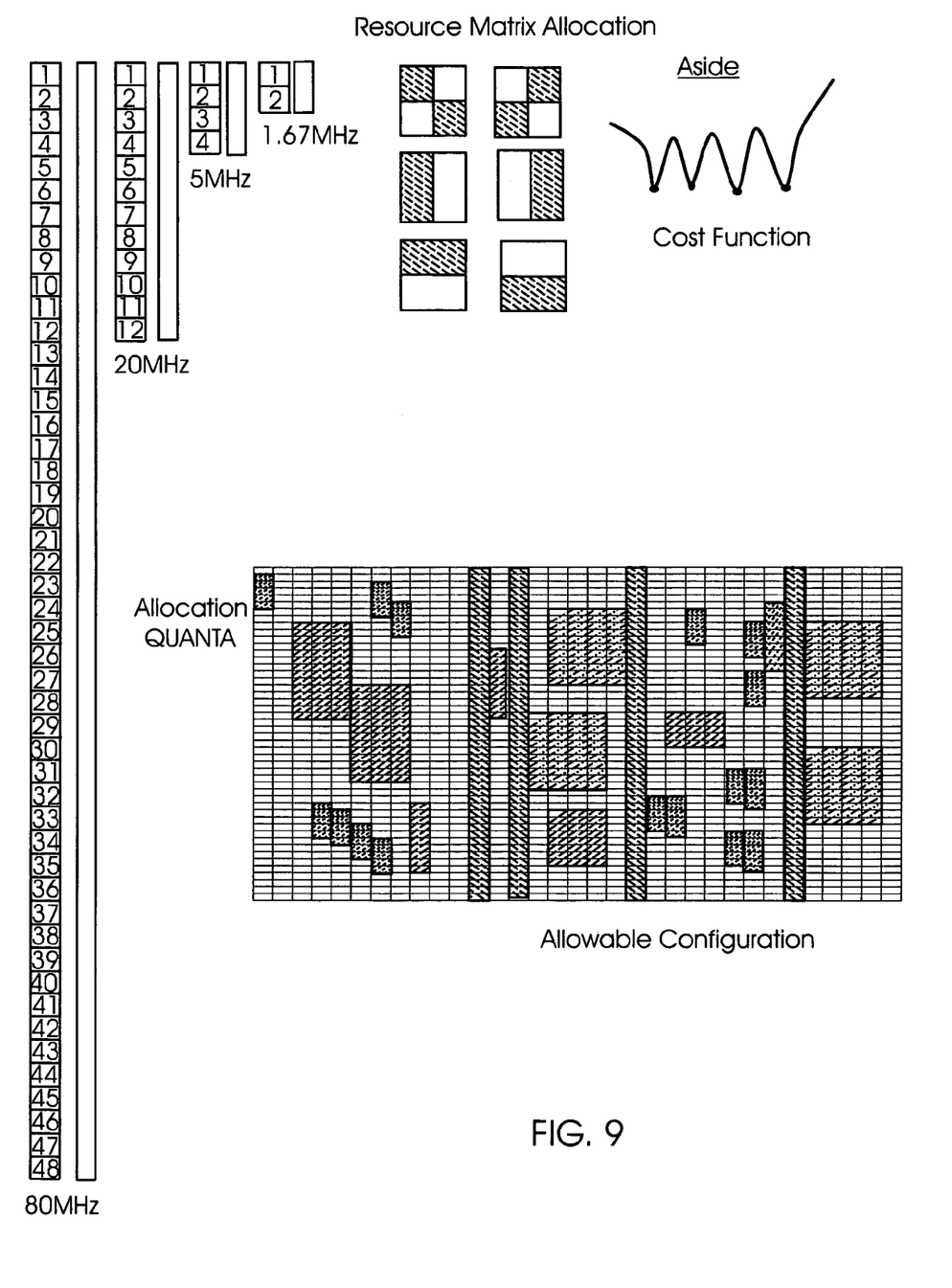
FIG. 9 illustrates a sample Resource Matrix allocation, according to one aspect of the present invention.

The Optimizer 10B may allocate the resources of the payload terminal in different ways. FIG. 9 provides one such example. The same amount of resources can be allocated in a number of ways as shown in the sample set of 2×2 matrices in FIG. 9. In case when a ground terminal 11 supports a plurality of bandwidths, the allocation of quanta of resources of payload terminal 10 Optimizer B is expanded to support the different bandwidths (as shown in FIG. 9). The initial step of allocation of resources of the payload terminal 10 concludes in step S403, after allocation of one or more quanta of resources of the payload terminal 10 as represented in S402 of FIG. 4.

Once the initial allocation of resources of the payload terminal 10 has been accomplished, the Optimizer 10B verifies the resource allocation matrix for the given epoch time for: a) each ground terminal 11 to verify if the allocation of resources of the payload terminal 10 has exceeded the resource capacity of the ground terminal 11, or b) payload terminal 10 to verify if the allocation of resources of the payload terminal 10 has exceeded the resource capacity of the payload terminal 10. If the allocation of resources of the payload terminal 10 has exceeded the resource capacity of any ground terminal 11 or has exceeded the resource capacity of the payload terminal 10 or both, Optimizer 10B performs a backward recursion and proceeds to re-allocate the flow requests or the resources of the payload terminal 10 for the flow requests. The process of reallocating flow requests referenced in step S203 of FIG. 2 is now explained in greater detail in FIG. 5.

Figure 5:
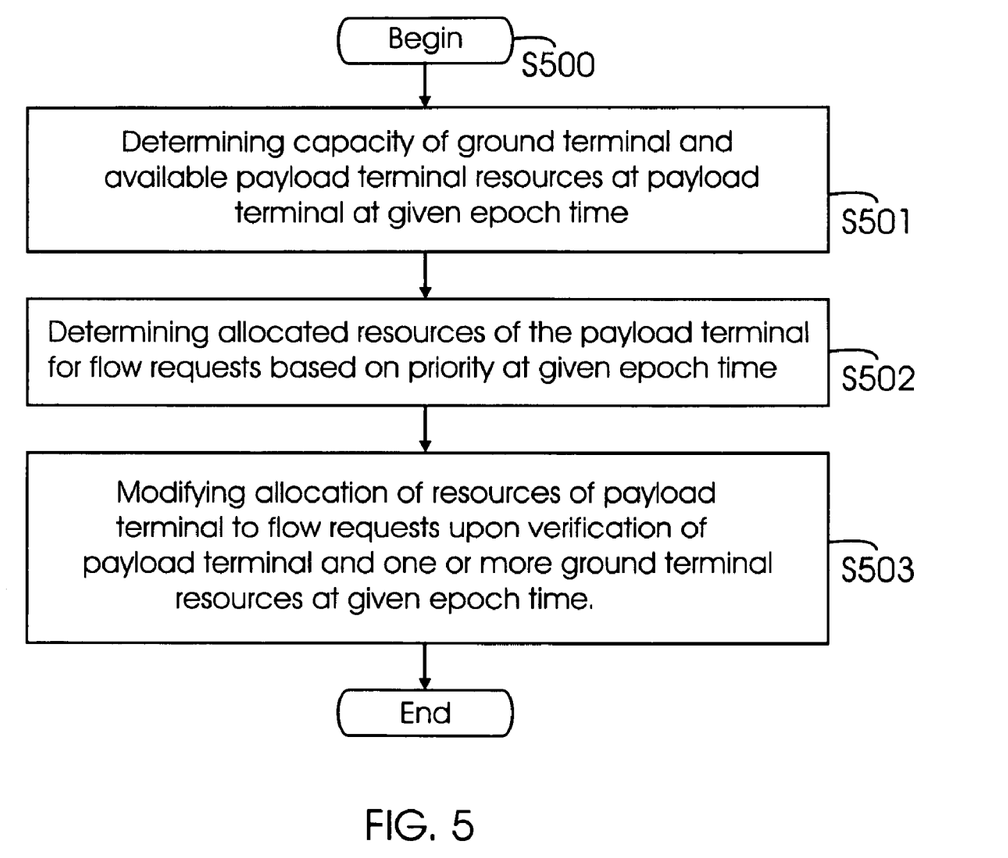
FIG. 5 shows a flow diagram for allocating flow requests based on available resources of payload terminal as referenced in FIG. 2.

The process of re-allocation begins at step S500 in FIG. 5. In step S501, the resource capacity of each of the ground terminal 11 and the payload terminal 10 is determined by verifying the resource allocation matrix at the payload terminal 10 for each of the ground terminal 11 and the payload terminal 10 during the given epoch time.

In S502, the Optimizer 10B determines the aggregate allocated resources of the payload terminal 10 for the particular ground terminal 11 and the aggregate allocated resources of the payload terminal 10 for all the ground terminals 11. This can be verified by calculating the allocated resources of payload terminal 10 for the particular ground terminal 11 across all QOS levels for the ground terminal 11 and by calculating the allocated resources of payload terminal 10 for all the ground terminals 11 across all QOS levels for the given epoch time respectively using the resource allocation matrix. If the allocated resources of the payload terminal 10 across all the ground terminals 11 exceed the payload terminal's resource capacity or if the allocated resources of the payload terminal 10 for a particular ground terminal 11 exceed the particular ground terminal's resource capacity, Optimizer 10B would modify the allocation of resources of the payload terminal 10 accordingly.

In step S503, the allocation of resources for payload terminal 10 are modified. This can be attained as follows: If the allocated resources of the payload terminal 10 have exceeded the resource capacity of a ground terminal 11, Optimizer 10B moves one or more of flow requests at the bottom of the demand matrix with the lowest priority from the current epoch time out of the current demand matrix, update the demand matrix, re-order the demand matrix for the given epoch time and the resource allocation matrix for the current epoch time is updated with the modified allocation of resources.

Alternatively, Optimizer 10B can move one or more flow requests at the bottom of the demand matrix to a subsequent epoch time by moving the flow request from the current demand matrix to a subsidiary demand matrix for later allocation so that the flow request is not lost in the communication system, the demand matrix is updated and re-ordered based on the priority for current epoch time and the resource allocation matrix for the current epoch time is updated with the modified allocation of resources. Optimizer 10B continues the allocation and re-allocation of the remaining flow requests for the epoch time. For instances where the resources of the payload terminal 10 are insufficient to service the flow request, Optimizer 10B proceeds in allocating remaining available resources (if any) of the payload terminal 10 to the flow request and continues to update the demand matrix and the resource allocation matrix with the modified resources of payload terminal 10.

Figure 6:
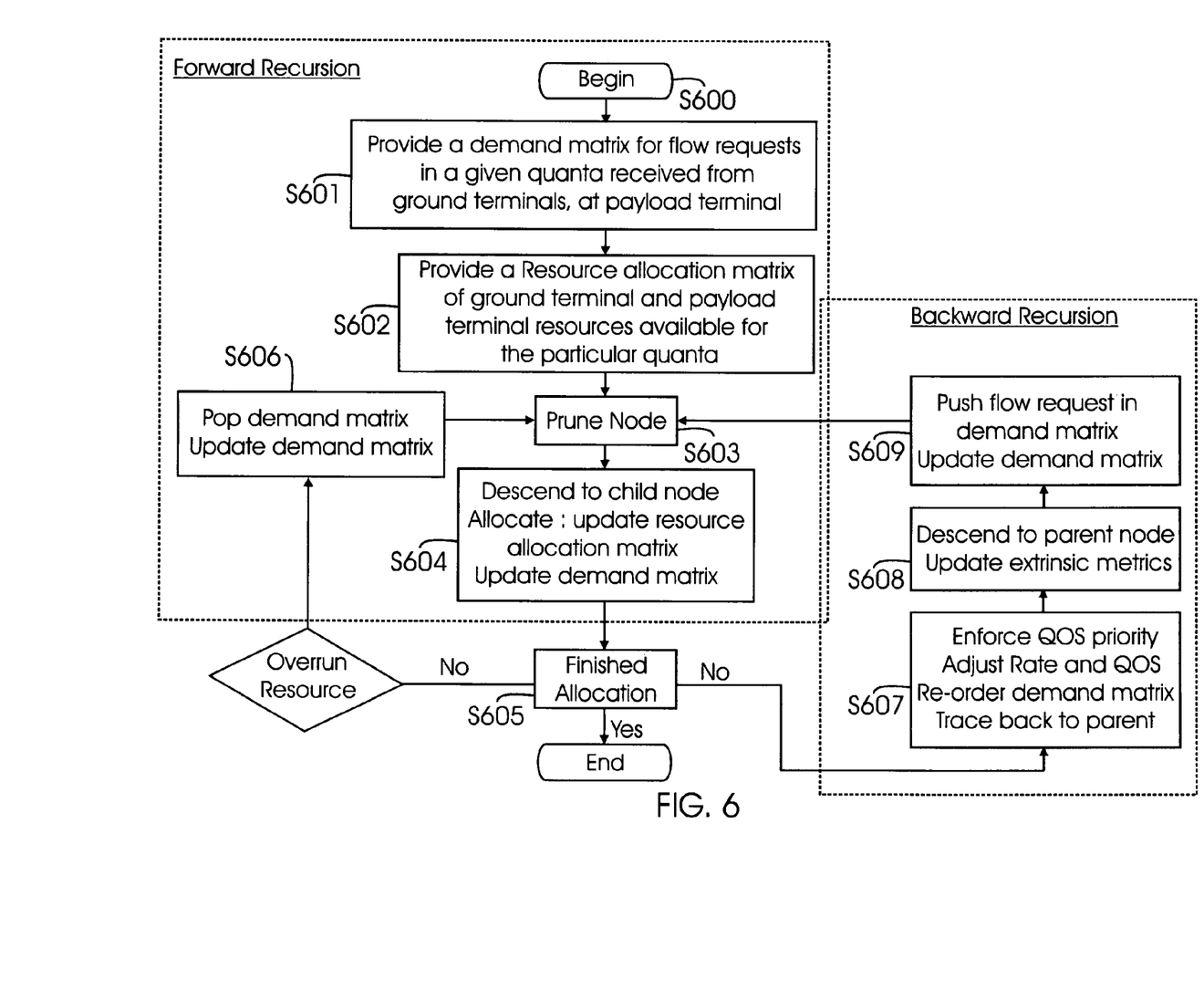
FIG. 6 shows a flow diagram depicting the steps involved in the forward recursion and backward recursion of the Optimizer, according to one aspect of the present invention.

FIG. 6 illustrates the forward recursion and backward recursion process, in one embodiment of the invention. The process begins in S600. In step S601 a demand matrix is provided at a payload terminal 10. This demand matrix is then populated with flow requests received at the payload terminal 10 from a plurality of ground terminals 11 during a given epoch time.

In step S602, a resource allocation matrix indicating available ground terminal 11 resource capacities and limitations and payload terminal's 10 available resources at a particular epoch time is provided.

In step S603, the nodes are pruned. The nodes as referenced here are flow requests arranged in various branches of a flow request tree. The flow requests at the top of the tree (See FIG. 10), representing highest priority, are called the parent nodes. Flow requests at subsequent levels are the children nodes to the respective parent nodes.

In step S603, the flow requests at the parent nodes are first allocated payload terminal 10 resources and the demand matrix and resource allocation matrix for the particular payload terminal 10 is updated. Once the resources of the payload terminal 10 have been allocated to all the parent nodes and the resource allocation matrix and demand matrix have been updated, the process proceeds to the next level of the flow request tree where the resources of the payload terminal 10 are allocated to the child node, based on the availability of resources at both the payload terminal 10 and the respective ground terminal 11. The resource allocation matrix and demand matrix is updated for all the children nodes. Once all the flow requests have been allocated resources of the payload terminal 10, as shown in S605, the process ends with the servicing of the flow requests using the allocated resources of the payload terminal for the given epoch time.

If the Optimizer 10B has overrun either any one of the ground terminal's resource capacity or payload terminal 10 resources during allocation, the process proceeds to step S606. In step S606 the flow request is removed out of the current demand matrix and the current demand matrix is updated accordingly. The flow request that was removed or "popped" out of the demand matrix can be allocated to a subsequent time slot. This re-allocation of the popped flow request to a subsequent time slot can be accomplished by updating the popped flow request onto a subsidiary demand matrix under the particular ground terminal 11 and the subsidiary demand matrix can then update the demand matrix for a subsequent epoch time. By re-allocating the flow request to a subsequent flow time one can ensure that no flow request gets lost in the communication system.

After popping the flow request and updating the demand matrix accordingly, the process loops back to S603 and continues with the allocation for the remaining flow requests until all the flow requests are either assigned resources of the payload terminal 10 or popped out. If the Optimizer 10B has not finished allocation of resources for all the flow requests in the demand matrix, the process flows through step S607, where the priority is followed. The QOS and the Rate are adjusted based on the allocation of resources of the payload terminal 10. The demand matrix is re-ordered to reflect the allocation of resources to prior flow requests at the higher priority level. Optimizer 10B proceeds to the parent node and updates the extrinsic metrics (bandwidth, channels, time slots, modulation modes) in the resource allocation matrix, as illustrated in step S608.

In step S609, the demand matrix for the particular ground terminal 11 is updated with the allocated flow request.

The process of allocation and re-allocation is performed till all the flow requests have been serviced for the given epoch time. This process of dynamic allocation and re-allocation of flow requests helps in optimizing resource allocations while maintaining high quality of service for the flow requests originating from ground terminals 11.

In one aspect of the present invention, optimizer 10B manages resource allocation by monitoring flow requests arriving at the payload terminal, prioritizing the flow requests based on one or more flow request attributes and assigning the appropriate payload terminal resources to service the flow requests. The prioritizing of flow requests is done periodically and the allocation of resources at the payload terminal is done dynamically within the period based on the changing priority of flow requests. This method ensures that the flow requests from each ground terminal are serviced in a fair and expedient way allowing the communication system to efficiently maximize the utilization of payload terminal resources.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for optimizing a quality of service provided to one or more ground terminals when allocating a satellite payload terminal's (payload terminal) resources in response to a plurality of flow requests received by the payload terminal from the one or more ground terminals in a given epoch time, comprising:

prioritizing the plurality of flow requests received from the one or more ground terminals at the payload terminal for the given epoch time based upon a plurality of attributes of each of the plurality of flow requests, wherein each of the plurality of flow requests is a request for a service at an appropriate payload terminal over the given epoch time, wherein each of the plurality of flow requests includes a quality of service level attribute, and wherein each flow request received at a payload terminal is refreshed upon completion of the given epoch time;

allocating one or more of a plurality of resources of the payload terminal to each of the plurality of flow requests during the epoch time based on a first priority of each of the plurality of flow requests;

re-allocating the one or more resources of the payload terminal to the one or more of the plurality of flow requests by verifying the one or more of the plurality of resources of the payload terminal and one or more of a plurality of resource capacities of the one or more ground terminals during the epoch time;

removing the one or more of the plurality of flow requests for the given epoch time; and modifying one or more of a plurality of allocated resources of the payload terminal for each of the plurality of ground terminals based on a second priority of each of a plurality of remaining flow requests during said epoch time;

wherein the quality of service provided to the one or more ground terminals is optimized in the epoch time.

2. The method of claim 1, wherein prioritizing the plurality of flow requests further comprises:
   storing one or more of the plurality of flow request attributes for each of the plurality of flow requests received at the payload terminal during the epoch time in a demand matrix; and
   ordering each of the plurality of flow requests for the epoch time in the demand matrix based on the one or more attributes.

3. The method of claim 1, wherein the plurality of attributes of each of the plurality of flow requests include a rate request and a file size.

4. The method of claim 1, wherein allocating resources at the payload terminal for all of said plurality of flow requests based on the first priority further comprises:
   providing a plurality of quanta at the payload terminal, and
   allocating one or more quanta of resources of the payload terminal to said ground terminal for servicing each said flow request;
   wherein a quanta is defined as the product of a smallest frequency times a single time slot.

5. The method of claim 1, wherein re-allocating the one or more of the plurality of resources at the payload terminal further comprises:
   determining a capacity of each of the plurality of resources at each of the plurality of ground terminals for the given epoch time; determining a plurality of available resources of said payload terminal for the given epoch time; determining a plurality of allocated resources of the payload terminal for each of said plurality of ground terminals based on the first priority of said flow requests at the given epoch time; and modifying a plurality of allocated resources of the payload terminal for each of said plurality of ground terminals based on the second priority of the plurality of flow requests to ensure that the plurality of allocated resources of the payload terminal does not exceed a capacity of the plurality of resources at each of the plurality of ground terminals.

6. The method of claim 1, wherein modifying the plurality of allocated resources at the payload terminal further comprises:
   re-ordering one or more of the plurality of flow requests based on the second priority and on the plurality of available resources at each of said plurality of ground terminals.

7. The method of claim 6, further comprising: removing one or more flow requests with a lowest priority from a demand matrix for the given epoch time; and re-ordering the demand matrix based on a first priority of a plurality of remaining flow requests for the given epoch time.

8. The method of claim 6, further comprising: removing one or more of a plurality flow requests with a lowest priority from a demand matrix; moving the one or more of the plurality of flow requests to a subsequent time-slot; and
   re-ordering the demand matrix based on the second priority of the plurality of remaining flow requests for the given epoch time.

9. The method of claim 1, wherein the plurality of resources at the payload terminal are finite and bounded, said plurality of resources at the payload terminal including one or more of a payload terminal identification a bandwidth supported, a supported modulation, a number of time slots available for each frame a number of channels available in the supported bandwidth, and a plurality of types of channels supported.

10. A satellite resource allocation system, comprising:
   one or more of a plurality of ground terminals:
   one or more of a plurality of payload terminals in orbit around the earth and in communication with the one or more plurality of ground terminals, each of the plurality of payload terminals having a processing unit configured to perform actions comprising:
   executing an optimization process to allocate a plurality of payload terminal resources in response to a plurality of flow requests from the one or more of the plurality of ground terminals while also maximizing a quality of service level for each of the plurality of flow requests;
   prioritizing the plurality of flow requests received at the payload terminal for a given epoch time based upon a plurality of attributes of the plurality of flow requests;
   allocating one or more of the plurality of resources of the payload terminal to each of the plurality of flow requests during the epoch time based on a first priority of each of the plurality of flow requests; and
   re-allocating the one or more of the plurality of resources of the payload terminal to one or more of the plurality of flow requests by a verification of the plurality of resources of the payload terminal and a plurality of resource capacities of one or more of the plurality of ground terminals during said epoch time;
   removing one or more of the plurality of flow requests for the given epoch time;
   modifying a plurality of allocated resources of the payload terminal for each of the plurality of ground terminals based on a second priority of each of a plurality of remaining flow requests during said epoch time; and
   wherein the quality of service provided to the one or more ground terminals is optimized in the epoch time.

11. The system of claim 10, wherein the flow request attributes for each of the plurality of flow requests received at the payload terminal during the given epoch time are stored in a demand matrix; and the flow requests for the epoch time in the demand matrix based on one or more of the plurality of flow request attributes are ordered.

12. The system of claim 10, wherein attributes of said flow requests includes one or more of a plurality of Quality of Service values, a rate request and a file size.

13. A method for allocating a plurality of resources of a satellite payload terminal in response to a plurality of flow requests received by the payload terminal from one or more of a plurality of ground terminals while optimizing a quality of service provided to the one or more of the plurality of ground terminals, comprising: storing one or more of a plurality of attributes for each of the plurality of flow requests received at the one or more payload terminals during a given epoch time in a demand matrix; ordering each of the plurality of flow requests for the epoch time in the demand matrix based on the one or more attributes; providing a plurality of quanta of resources of the payload terminal, and allocating one or more of the plurality of quanta of resources of the payload terminal to said ground terminal for servicing each said plurality of flow requests; determining a capacity of each of the plurality of resources at each said ground terminal for the given epoch time: determining a plurality of available resources of said payload terminal for the given epoch time; determining a plurality of allocated resources of the payload terminal for each of the plurality of ground terminals based on a first priority of said plurality of flow requests for the given epoch time; and when the plurality of allocated resources of the payload terminal exceeds the plurality of available resources of said payload terminal for the given epoch time, removing one or more of the plurality of flow requests for the given epoch time from a plurality of ordered flow requests in the demand matrix; and modifying the plurality of allocated resources of the payload terminal for each of said plurality of ground terminals based on a second priority of a plurality of remaining flow requests in the demand matrix during said epoch time to ensure that plurality of allocated resources of the payload terminal does not exceed the plurality of available resources of said payload terminal;

wherein the plurality of resources of the satellite payload terminal are allocated in response to the plurality of flow requests received by the payload terminal from the one or more of the plurality of ground terminals and the quality of service provided to the one or more of the plurality of ground terminals is optimized in the epoch time.

14. The method of claim 13, wherein the plurality of attributes of said flow requests includes, a rate request and a file size.

15. The method of claim 13, wherein removing the one or more of the plurality of flow requests further includes removing one or more of a plurality of flow requests with a lowest priority from the demand matrix for the given epoch time; and re-ordering the demand matrix based on the second priority of a plurality of remaining flow requests for the given epoch time.

16. The method of claim 13, further comprising:
    moving said one or more of the plurality of flow requests to a subsidiary demand matrix for a later allocation;
and re-ordering the demand matrix based on the second priority of the plurality of remaining flow requests for the given epoch time.

17. The method of claim 13, wherein the plurality of resources at the payload terminal are finite and bounded, said plurality of resources at the payload terminal includes one or more of a payload terminal identification, a supported bandwidth, a supported modulation mode, a number of time slots available for each frame, a number of channels available in the supported bandwidth and a plurality of types of channels supported.

\* \* \* \* \*